US011552544B2

(12) United States Patent
Scandola et al.

(10) Patent No.: US 11,552,544 B2
(45) Date of Patent: Jan. 10, 2023

(54) DYNAMIC CURRENT DETECTION LOOPS FOR MULTIPHASE POWER CONVERTER

(71) Applicant: Infineon Technologies AG, Neubiberg (DE)

(72) Inventors: Luca Scandola, Villafranca di Verona (IT); Cristian Garbossa, Bressanone (IT)

(73) Assignee: Infineon Technologies AG, Neubiberg (DE)

( * ) Notice: Subject to any disclaimer, the term of this patent is extended or adjusted under 35 U.S.C. 154(b) by 24 days.

(21) Appl. No.: 17/241,669

(22) Filed: Apr. 27, 2021

(65) Prior Publication Data

US 2022/0345024 A1 Oct. 27, 2022

(51) Int. Cl.
*H02M 3/158* (2006.01)
*H02M 1/00* (2006.01)

(52) U.S. Cl.
CPC ......... *H02M 1/0009* (2021.05); *H02M 3/158* (2013.01)

(58) Field of Classification Search
CPC .. H02M 1/0009; H02M 3/158; H02M 3/1584; H02M 3/1586
See application file for complete search history.

(56) References Cited

U.S. PATENT DOCUMENTS

| 9,793,800 | B1 * | 10/2017 | Yan | H02M 3/1584 |
|---|---|---|---|---|
| 9,973,089 | B1 * | 5/2018 | Terasawa | H02M 3/158 |
| 10,284,095 | B1 * | 5/2019 | Mednik | H02M 3/1584 |
| 2005/0140347 | A1 * | 6/2005 | Chen | H02M 3/1584 |
| | | | | 323/282 |

OTHER PUBLICATIONS

NXP "VR5500 High voltage PMIC with multiple SMPS and LDO," Preliminary Data Sheet, Rev. 3, May 22, 2019, 130 pp.
Grigore et al., "Dynamics of a Buck Converter with a Constant Power Load," 29th Annual IEEE Power Electronics Specialist Conference, May 22, 1998, IEEE, 7 pp.
Infineon Technolgies AG, "OPTIREG™ PMIC TLF35584," Rev 1.0, Mar. 25, 2019, IFX-jmv1546509847065, 7 pp.
Dragoi, "Optimizing the front-end power solution for automotive ADAS systems," Advances in Science, Technology and Engineering Systems Journal vol. 2, No. 3, Aug. 24, 2017, 8 pp.

(Continued)

*Primary Examiner* — Alex Torres-Rivera
(74) *Attorney, Agent, or Firm* — Shumaker & Sieffert, P.A.

(57) ABSTRACT

A circuit may be configured detect current in different phases of an N-phase power converter. The circuit may comprise a first set of elements defining at least part of a first current loop associated with a first phase of the power converter, wherein the first set of elements is configured to detect current during the first phase of the power converter. In addition, the circuit may comprise a second set of elements defining at least part of a second current loop associated with a second phase of the power converter, wherein the second set of elements is configured to detect current during the second phase of the power converter when a duty cycle associated with the different phases is greater than 100/N, and wherein the first set of elements is configured to detect current during the second phase of the power converter when the duty cycle is less than 100/N.

20 Claims, 9 Drawing Sheets

(56) References Cited

OTHER PUBLICATIONS

Cespedes et al., "Constant-Power Load System Stabilization by Passive Damping," IEEE Transactions on Power Electronics, vol. 26, No. 7, Jul. 2011, 5 pp.
Khaligh et al., "Realization of Parasitics in Stability of DC-DC Converters Loaded by Constant Power Loads in Advanced Multiconverter Automotive Systems," IEEE Transactions on Industrial Electronics, vol. 55, No. 6, Jun. 2008, 11 pp.
U.S. Appl. No. 17/241,617, filed Apr. 27, 2021, naming inventors Arpino et al.
U.S. Appl. No. 17/241,556, filed Apr. 27, 2021, naming inventors Garbossa et al.

* cited by examiner

DYNAMIC CURRENT DETECTION LOOPS FOR MULTIPHASE POWER CONVERTER

TECHNICAL FIELD

This disclosure relates to power converters, and more specifically, to circuits and techniques for detecting and controlling current in the different phases of a multiphase power converter.

BACKGROUND

In many systems, power converters are used to control voltage and/or current levels withing the system. Power converters may comprise buck converters, boost converters, buck/boost converters, or other types. Some buck converters, for example, may comprise an LC circuit that is connected to a switch node, where the switch node is positioned between a high-side power switch and a low-side power switch. The high-side and low-side power switches are controlled by driver circuits via modulation control signals, such as pulse width modulation (PWM) signals, pulse frequency modulation (PFM) signals, pulse duration modulation signals, pulse density modulation signals, or another type of modulation control signal.

In particular, modulation control signals can be applied to the gates of the high-side and low-side power switches to control the on/off switching of the power switches. The on/off switching of the power switches effectively controls the delivery of power to the switch node that is located between the high-side switch and the low-side switch that form a half bridge. In this way, by controlling the high-side and low-side switches of a DC/DC converter, a desired level of current and voltage can be output from the DC/DC converter in order to provide power to a load or another component of the system.

Multiphase power converters have been developed to deliver high levels of current, and to adapt to changing load conditions. Multiphase power converters typically include separate inductors for each phase of the power converter. Current can be delivered in phases though the different inductors to achieve a higher level of overall current through the power converter. It is often desirable to monitor the current delivered in different phases of a multiphase power converter, and it is desirable to achieve current balance among the different phases. Where there is current mismatch between different phases, this can sometimes result in thermal imbalances or other undesirable effects or degradation in the performance of the power converter circuit.

SUMMARY

This disclosure describes a multiphase power converter, and circuits and techniques for detecting current in different phases of the multiphase power converter. According to this disclosure, one or more elements used to detect current in different phases may be shared among the different phases, but this sharing may be limited to situations where there is no current overlap between the phases. When there is current overlap, the different phases may utilize unique sets of circuit elements for current detection in the different phases, but where there is no current overlap, the different phases may share one or more circuit elements for current detection. In this way, when there is no current overlap, by using common circuit elements for current detection, mismatch of such circuit elements can be eliminated, which can improve the relative accuracy of current detection in the different phases. Current overlap between phases may occur when the duty cycle of one or more phases is greater than 100/N, where N is a positive integer greater than 1 that represents a number of phases in the N-phase power converter.

In some examples, this disclosure describes a circuit configured detect current in different phases of an N-phase power converter, wherein N is a positive integer greater than 1 that represents a number of phases in the N-phase power converter. The circuit may comprise a first set of elements defining at least part of a first current loop associated with a first phase of the power converter, wherein the first set of elements is configured to detect current during the first phase of the power converter. In addition, the circuit may comprise a second set of elements defining at least part of a second current loop associated with a second phase of the power converter, wherein the second set of elements is configured to detect current during the second phase of the power converter when a duty cycle associated with the different phases is greater than 100/N, and wherein the first set of elements is configured to detect current during the second phase of the power converter when the duty cycle is less than 100/N.

In some examples, this disclosure describes a method that comprises detecting current in a first phase a multiphase power converter using a first set of circuit elements, and detecting current in a second phase of the multiphase power converter using a second set of circuit elements when a duty cycle duty cycle associated with different phases of the multiphase power converter is greater than 100/N, wherein N is a positive integer greater than 1 that represents a number of phases in the multiphase power converter. The method may also comprise detecting current in the second phase of the multiphase power converter using the first set of circuit elements when the duty cycle duty cycle is less than 100/N.

In some examples, this disclosure describes a multiphase power converter that comprises a plurality of inductors associated with N phases of the multiphase power converter, wherein N is a positive integer greater than 1 that represents a number of phases in the multiphase power converter; one or more output capacitors that are charged by the plurality of inductors during the N phases; and a circuit configured detect current in different phases of the multiphase power converter. The circuit may comprise a first set of elements defining at least part of a first current loop associated with a first phase of the multiphase power converter, wherein the first set of elements is configured to detect current during the first phase of the multiphase power converter; and a second set of elements defining at least part of a second current loop associated with a second phase of the multiphase power converter, wherein the second set of elements is configured to detect current during the second phase of the multiphase power converter when a duty cycle associated with the different phases is greater than 100/N. The first set of elements is configured to detect current during the second phase of the multiphase power converter when the duty cycle is less than 100/N.

Details of these and other examples are set forth in the accompanying drawings and the description below. Other features, objects, and advantages will be apparent from the description and drawings, and from the claims.

DETAILED DESCRIPTION

This disclosure describes a multiphase power converter, and circuits and techniques for detecting current in different phases of the multiphase power converter. The current detection may be used to control current balancing between phases of the multiphase power converter, which is desirable. A circuit may include a voltage regulation loop, and various current detection loops for different phases of the multiphase power converter.

According to this disclosure, one or more elements used in current detection loops to detect current in different phases may be shared among the different phases, but this sharing may be limited to situations where there is no current overlap between the phases. When there is current overlap, the different phases may utilize different sets of circuit elements for the current loops in the different phases, but where there is no current overlap, the different phases may share one or more circuit elements for the current detection loops. In this way, when there is no current overlap, by using common circuit elements for current detection, mismatch of such circuit elements can be eliminated, which can improve the relative accuracy of current detection in the different phases.

Current overlap between phases may occur when the duty cycle of one or more phases is greater than 100/N, where N is a positive integer greater than 1 that represents a number of phases in the N-phase power converter. For example, there is current overlap in a two-phase power converter when the duty cycle is greater than 50%, and there is current overlap in a three-phase power converter when the duty cycle is greater than 33.3%. Similarly, there is current overlap between phases in a four-phase power converter when the duty cycle is greater than 25%, and so forth. In general, there is current overlap when current is delivered in two or more phases simultaneously. Again, according to this disclosure, when there is current overlap, the different phases may utilize unique sets of circuit elements for current detection in the different phases, but where there is no current overlap, the different phases may share one or more circuit elements for current detection.

Figure 1:
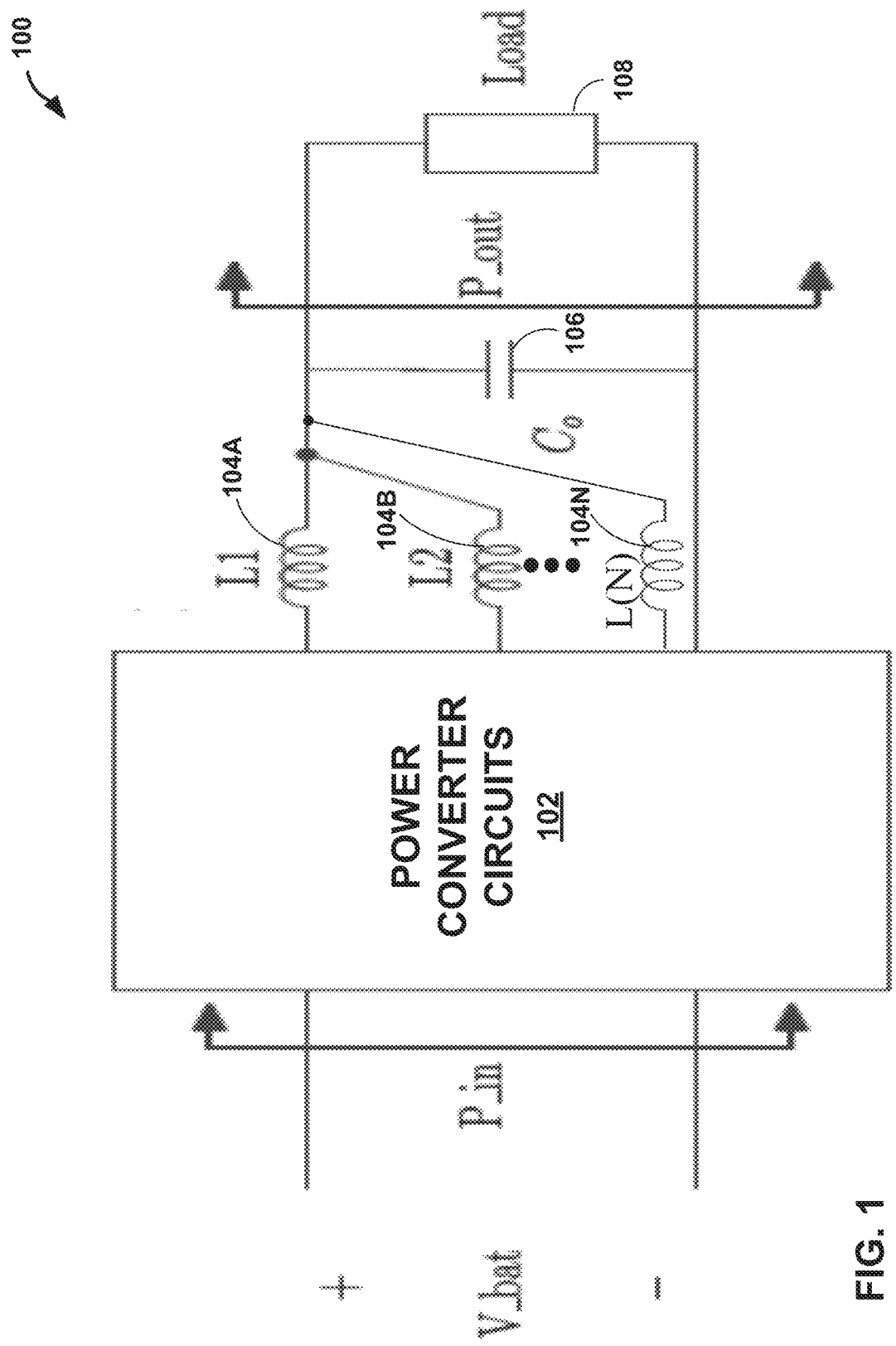
FIG. 1 is a block and circuit diagram illustrating one example multiphase power converter.

FIG. 1 is a block and circuit diagram illustrating one example multiphase power converter 100 that may implement circuits or techniques of this disclosure. Multiphase power converter 100 may comprise power converter circuits 102. Power converter circuits 102 may comprise power transistors arranged in a half-bridge configuration in order to control the delivery of input power (P_in) to a switch node located between the power transistors. The input power (P_in), for example, may come from a battery (V_bat) or another power source. Each phase of multiphase power converter 100 may include power transistors arranged in a half-bridge.

Multiphase power converter 100 may also comprise inductor L1 104A, inductor L2 104B, and inductor L(N) 104N. Multiphase power converter 100 may comprise N phases, where N represents any positive integer greater than 1. Each phase may include an inductor that forms an inductor-capacitor (LC) circuit with output capacitor 106 during any given phase. Output capacitor Co 106 may represent one capacitor or any number of capacitors. By controlling half-bridge circuits within power converter circuits 102, power is delivered through inductors 104A-104N in different phases, charging capacitor 106 to create a desired amount of output power (P_out) for load 108.

Power converter circuits 102 may be configured to achieve current balancing among the different N phases of multiphase power converter 100. To facilitate such current balancing, power converter circuits 102 may include a voltage regulation loop and various current monitoring loops associated with the different N phases. According to this disclosure, when there is no current overlap between phases, some or all of the circuit elements in the current monitoring loops of power converter circuits 102 may be shared for current detection in the different N phases. The different current detection loops of power converter circuits 102 may be used when there is current overlap between different phases, but where there is no current overlap between phases of power converter 100, power converter circuits 102 may be configured to share one or more current detection components so as to eliminate mismatch between components.

Figure 2A:
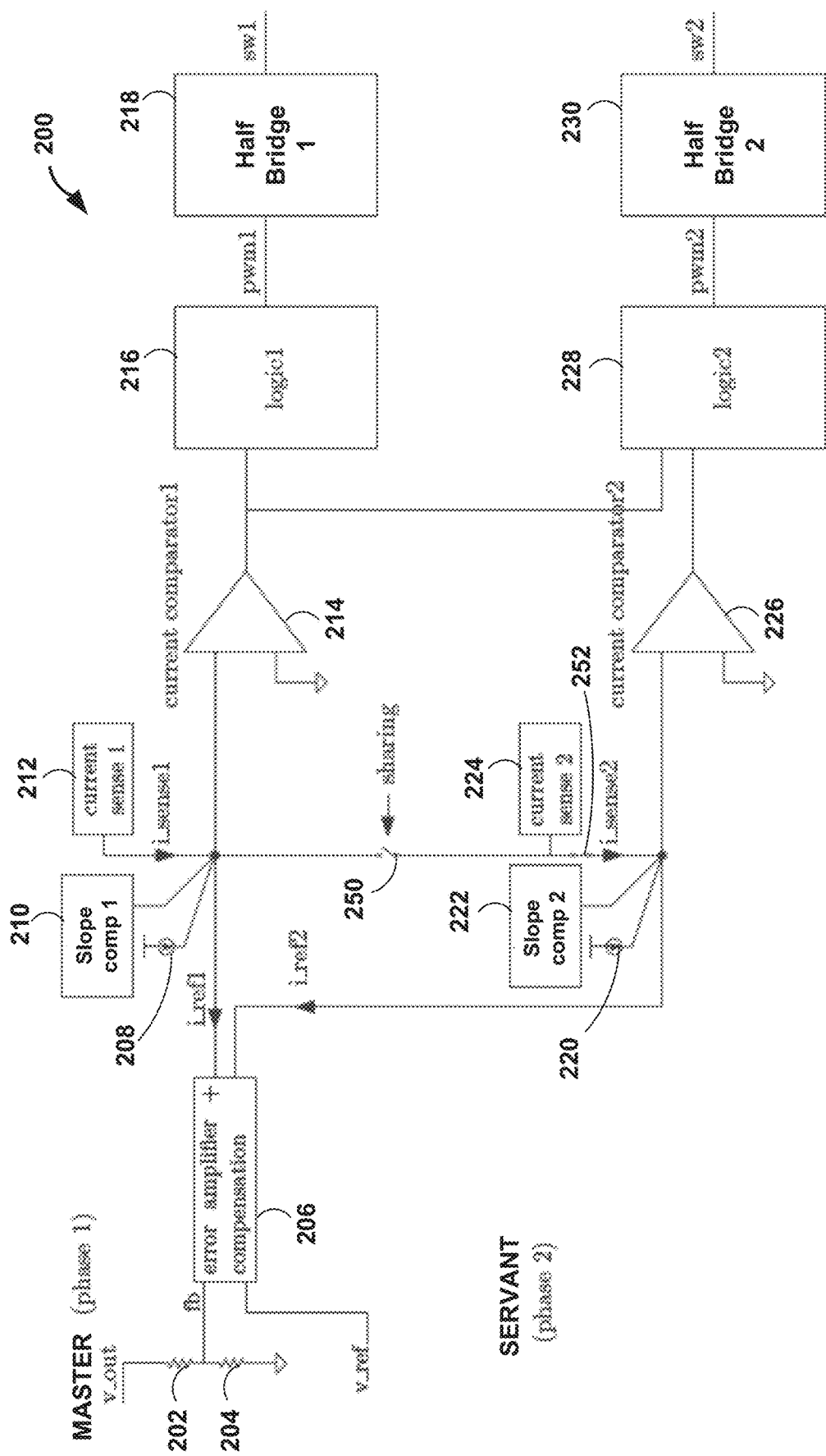
FIGS. 2A and 2B are a block diagrams of a circuit that includes a voltage regulation loop and two different current detection loops for a multiphase power converter.
Figure 2B:
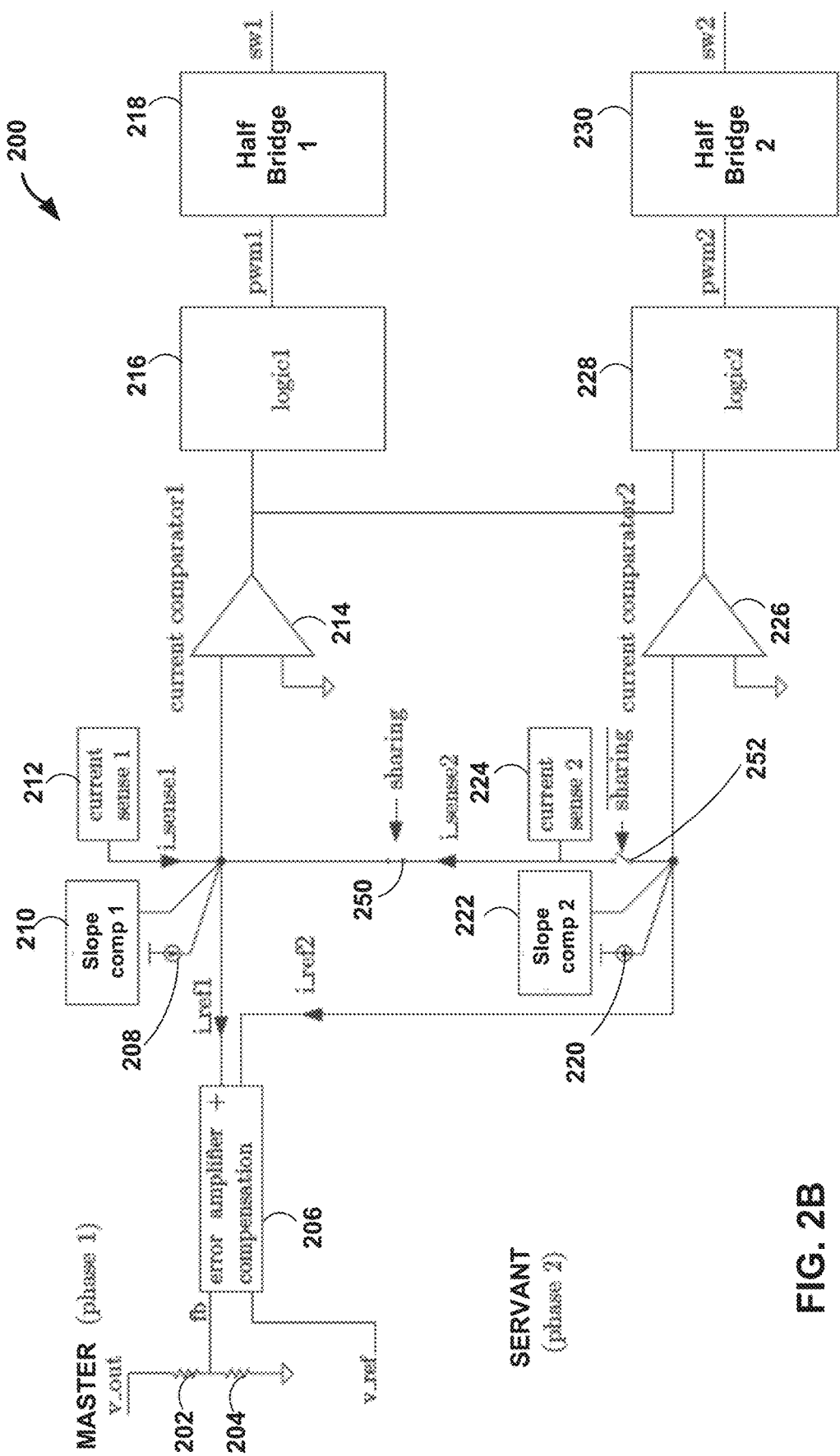

FIGS. 2A and 2B are a block diagrams of a circuit 200 that includes a voltage regulation loop and two different current detection loops for a multiphase power converter. The circuit 200 shown in FIGS. 2A and 2B, for example, may comprise current detection circuits within power converter circuits 102. For simplicity and ease of illustration, FIGS. 2A and 2B only show two current loops (i.e., for two phases). The techniques of this disclosure, however, may apply to multiphase power converter that comprise any number N of phases, and therefore, current monitoring circuits may likewise include any number N of current detection loops.

Circuit 200 may be viewed as including a master circuit associated with phase 1, and a servant circuit associated with phase 2. If there were additional phases, there would be additional servant circuits forming current detection in the additional phases. As described in detail below, some components of a current detection loop may be shared between phase 1 and phase 2, when there is no current overlap between phase 1 and phase 2.

Circuit 200 comprises a master circuit that includes an error amplifier and compensation circuit 206. Error amplifier and compensation circuit 206 receives a feedback voltage (FB) that is indicative of the output of a power converter. The output voltage of the power converter may be divided by a resistor network 202 and 204 to generate the feedback voltage (FB) used by error amplifier and compensation circuit 206. In this way, error amplifier and compensation circuit 206 forms a primary voltage regulation loop for circuit 200 that is based on the output of a power converter. The master circuit within circuit 200 can be viewed as including the voltage regulation loop.

In addition to the voltage regulation loop, the master circuit within circuit 200 also includes a first current detection loop (also called a master current detection loop). The first current detection loop may comprise a first pedestal unit 208, a first slope compensator unit 210, a first current sensing unit 212, and a first comparator 214. First pedestal unit 208 may introduce a so-called "pedestal current," which can adjust a bias the output of error amplifier and compensation circuit 206 to improve operation of the current detection loop. First slope compensator unit 210 may be configured to provide measurement compensation for an upward slope in current over time. First current sensing unit 212 may comprise a current sensor that is configured to detect at the node "i_sense1," and first current comparator 214 may be configured to compare the sense current at the node "i_sense1" to an algebraic summation of iRef1, a slope compensation component defined by first slope compensation unit 220, and a pedestal current defined by first pedestal unit 208. The algebraic sum of may define a dynamic current threshold for the first current detection loop. The output of current comparator 214 may complete the master current detection loop and may be indicative of any current error or adjustment for the first phase of the power converter. Thus, the output of current comparator 214 may provide a control signal for logic 216 to control half bridge 218 based on the detected current in the first phase. The master current detection loop comprises pedestal unit 208, first slope compensator unit 210, first current sensing unit 212, and first comparator 214, all of which perform functions associated with the master current detection loop.

Circuit 200 may also include one or more servant circuits associated with each additional phase of the power converter. Only one servant is illustrated in FIGS. 2A and 2B, but circuit 200 may include any number (N) of servant circuits that are similar to phase 2 for any number N of phases of a multiphase power converter.

As shown in FIGS. 2A and 2B, the servant circuit of circuit 200 may define a second current detection loop (also called a servant current detection loop). The second current detection loop may comprise a second pedestal unit 220, a second slope compensator unit 222, a second current sensing unit 224, and a second comparator 226. Similar to the first current detection loop, with the second current detection loop, second pedestal unit 220 may introduce a so-called "pedestal current," which can adjust a bias in the output of error amplifier and compensation circuit 206 to improve operation of the second current detection loop. Second slope compensator unit 222 may be configured to provide measurement compensation for an upward slope in current over time. Second current sensing unit 224 may comprise a current sensor that is configured to detect at the node "i_sense2," and second current comparator 226 may be configured to compare the sense current at the node "i_sense2" to an algebraic summation of iRef2, a slope compensation component defined by second slope compensator unit 222, and a pedestal current defined by second pedestal unit 220. The algebraic sum of may define a dynamic current threshold for the second current detection loop. The output of current comparator 226 may complete the servant current detection loop and may be indicative of any current error or adjustment for the second phase of the power converter. Thus, the output of current comparator 226 may provide a control signal for logic 228 to control half bridge 230 based on the detected current in the second phase. In this case, the servant current detection loop comprises second pedestal unit 220, a second slope compensator unit 222, a second current sensing unit 224, and a second comparator 226, all of which perform functions associated with the servant current detection loop.

Based on the current detected by the first current detection loop, first logic 216 may be configured to generate PWM signals for a first half bride 218. First half bridge 218 controls the duty cycle of a first stage of the power converter based on switch signal SW1. Switch signal SW1 may comprise a PWM signal applied to the gate of a power transistor within a first phase of a power converter. Similarly, based on the current detected by the second current detection loop, second logic 228 may be configured to generate PWM signals for a second half bridge 230. Second half bridge 230 controls the duty cycle of a second stage of the power converter based on switch signal SW2. Switch signal SW2 may comprise a PWM signal applied to the gate of a power transistor within a second phase of a multiphase power converter.

Unfortunately, there can be mismatch between components in the first current detection loop and components in the second current detection loop. In other words, there may be mismatch between first pedestal unit 208 and second pedestal unit 220, and there may be mismatch between first slop compensation unit 210 and second slope compensation unit 222. Additionally, there may be mismatch between first current sensing unit 212 and second current sensing unit 224, and there may be mismatch between first current comparator 214 and second current comparator 226. This mismatch in current detection components can result in inaccurate current measurements in different phases relative to other phases.

The techniques of this disclosure recognize that there are operating conditions of a multiphase power converter that may allow current detection loops to use at least the same components of other current detection loop, which can eliminate mismatch and provide better relative sensing between different phases. The components shown in FIGS. 2A and 2B may be necessary whenever there is current overlap between different phases of a multiphase power converter. However, wherever there is no current overlap, it may be beneficial to configure circuit 200 to use at lease some of the same components for the current loop in different phases and to avoid use of components that would otherwise introduce the mismatch.

In one example, switches 250 and 252 are used to facilitate the sharing of first pedestal unit 208, first slope compensator 210, and first current comparator 214 for both of the first and second current detection loops. FIG. 2A shows an example where circuit 200 is configured for no sharing. In this case, switch 250 is open and switch 252 is closed. The second current detection loop comprises second current sensor 224 operating with second pedestal unit 220, second slope compensator unit 222, and second comparator 226. The configuration in FIG. 2A may be beneficial whenever the duty cycle associated with at least one of the phases of the multiphase power converter is greater than 100/N. For example, with a two-phase power converter, the configuration in FIG. 2A may be beneficial whenever the duty cycle associated with at least one of the phases is greater than 50%.

FIG. 2B shows an example where circuit 200 is configured for sharing of circuit components in a current detection loop. In this case, switch 250 is closed and switch 252 is open. In this case, the second current detection loop comprises second current sensor 224 operating with first pedestal unit 208, first slope compensator unit 210, and first comparator 214. The configuration in FIG. 2B may be beneficial whenever the duty cycle associated with all of the phases of the multiphase power converter is less than 100/N. For example, with a two-phase power converter, the configuration in FIG. 2B may be beneficial whenever the duty cycle associated with each of the phases is less than 50%. In this case, since there is no current overlap between phases, sharing of first pedestal unit 208, first slope compensator unit 210, and first comparator 214 can occur in both current detection loops, which can reduce or eliminate deviations cased by mismatch of such components. In this case, the output of first current comparator 214 may provide a control signal for second logic 228 to control second half bridge 230 based on the detected current in the second phase. In this case, the second current detection loop comprises first pedestal unit 201, first slope compensator unit 210, second current sensing unit 224, and first current comparator 214, all of which perform functions associated with the second current detection loop.

Circuit 200 is one example of a circuit configured detect current in different phases of an N-phase power converter, wherein N is a positive integer greater than 1 that represents a number of phases in the N-phase power converter. Circuit 200 may comprise a first set of elements (e.g., elements 208, 210, 214) defining at least part of a first current loop associated with a first phase of the power converter, wherein the first set of elements is configured to detect current during a first phase of the power converter. Circuit 200 comprises a second set of elements (e.g., elements 220, 222 and 226) defining at least part of a second current loop associated with a second phase of the power converter, wherein the second set of elements is configured to detect current during the second phase of the power converter when a duty cycle associated with the different phases is greater than 100/N, and wherein the first set of elements (e.g., elements 208, 210, 214) is configured to detect current during the second phase of the power converter when the duty cycle is less than 100/N.

In the example illustrated in FIGS. 2A and 2B, the current sensing units 212 and 224 are not shared, although they could be shared in other examples. Consistent with the example shown in FIGS. 2A and 2B, a circuit 200 may comprise a first current sensing unit 212 and a second current sensing unit 224. First current sensing unit 212 and the first set of elements (e.g., elements 208, 210, 214) are configured to detect current during the first phase of the power converter. Second current sensing unit 224 and the second set of elements (e.g., elements 220, 222 and 226) are configured to detect current during the second phase of the power converter when the duty cycle is greater than 100/N. Second current sensing 224 unit and the first set of elements (e.g., elements 208, 210, 214) are configured to detect current during the second phase of the power converter when the duty cycle associated is less than 100/N.

As explained herein (and as shown in FIG. 1), a power converter may have any number of N phases. Thus, in some cases, the circuit shown in FIGS. 2A and 2B may include a third set of elements (e.g., similar to elements 220, 222 and 226) defining at least a portion of a third current loop associated with a third phase of the power converter, wherein the third set of elements is configured to detect current during a third phase of the power converter when the duty cycle is greater than 100/N, wherein the first set of elements (e.g., elements 208, 210, 214) is configured to detect current during the third phase of the power converter when the duty cycle is less than 100/N.

In some examples, the first set of elements may comprise master elements and the second set of elements comprise servant elements. However, in other examples, elements from servant circuits could be shared or used for sharing by the master circuit and vice versa. The terms master and servant are used herein for ease of demonstration, but any master components and/or servant components could be shared according to this disclosure in order to eliminate component mismatch in any situations where sharing is appropriate. Also, it is possible to share more or fewer components than shown in the example of FIGS. 2A and 2B. For example, in FIGS. 2A and 2B, the current sensing units 212 and 224 are not shared, although they could be shared in other examples. Also, in FIGS. 2A and 2B, each of elements 208, 210, 214 is shared, but it is also possible to only share some (and not all) of these components of the master current loop with servant current loops.

Figure 3A:
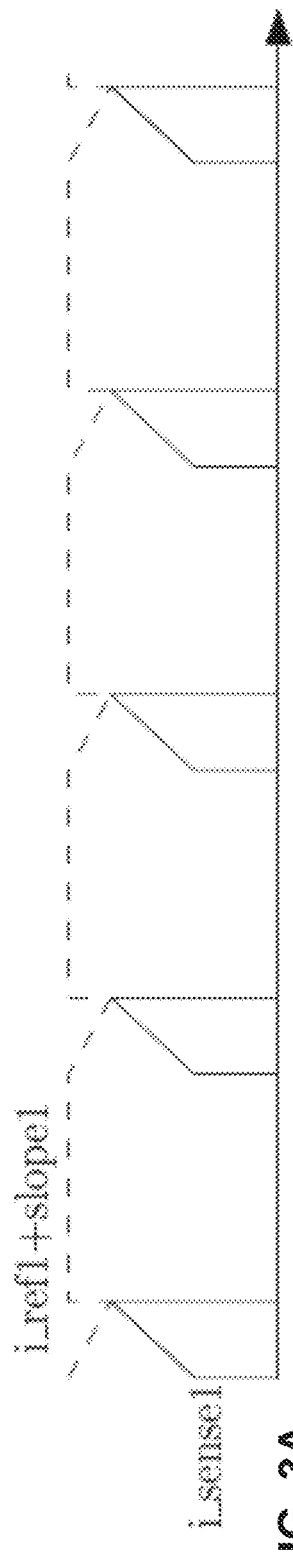
FIG. 3A is a graph illustrating current detection of a first phase of a power converter.
Figure 3B:
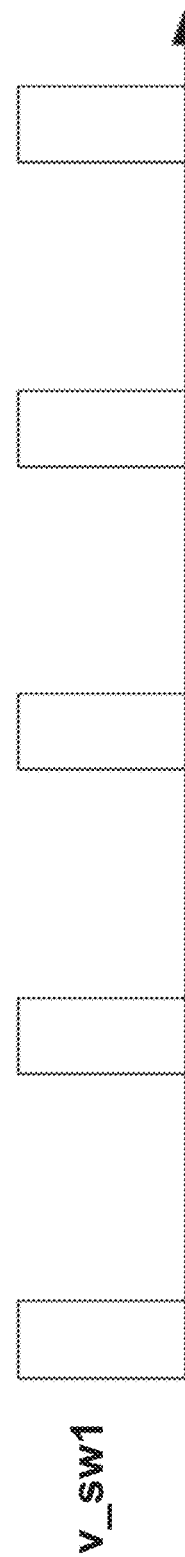
FIG. 3B is a graph illustrating switching node voltages associated with the first phase of the power converter when the duty cycle is less than 100/N.

FIG. 3A is a graph illustrating current detection of a first phase of a two-phase power converter. FIG. 3B is a graph illustrating switching node voltages associated with the first phase of the two-phase power converter when the duty cycle is less than 100/N. In this case, the v_sw1 may correspond to the duty cycle associated with the first phase of the two-phase power converter.

Figure 3C:
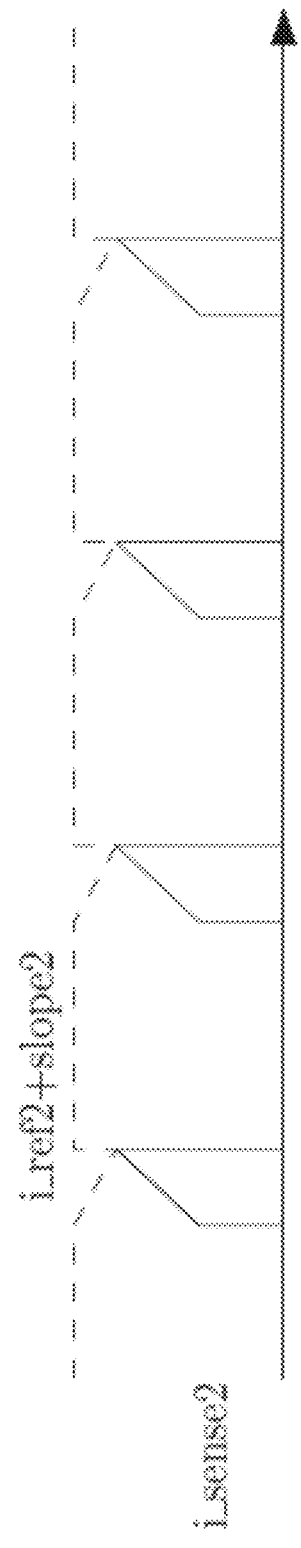
FIG. 3C is a graph illustrating current detection of a second phase of a power converter.
Figure 3D:
FIG. 3D is a graph illustrating switching node voltages associated with the second phase of the power converter when the duty cycle is less than 100/N.

FIG. 3C is a graph illustrating current detection of a second phase of a two-phase power converter. FIG. 3D is a graph illustrating switching node voltages associated with the second phase of the two-phase power converter when the duty cycle is less than 100/N. As can be seen in comparing graphs 3A and 3B to graphs 3C and 3D, there is no current overlap between the phases. Hence, sharing of one or more components of a current detection loop may be enabled in situations like that shown in FIGS. 3A-3D.

Figure 4A:
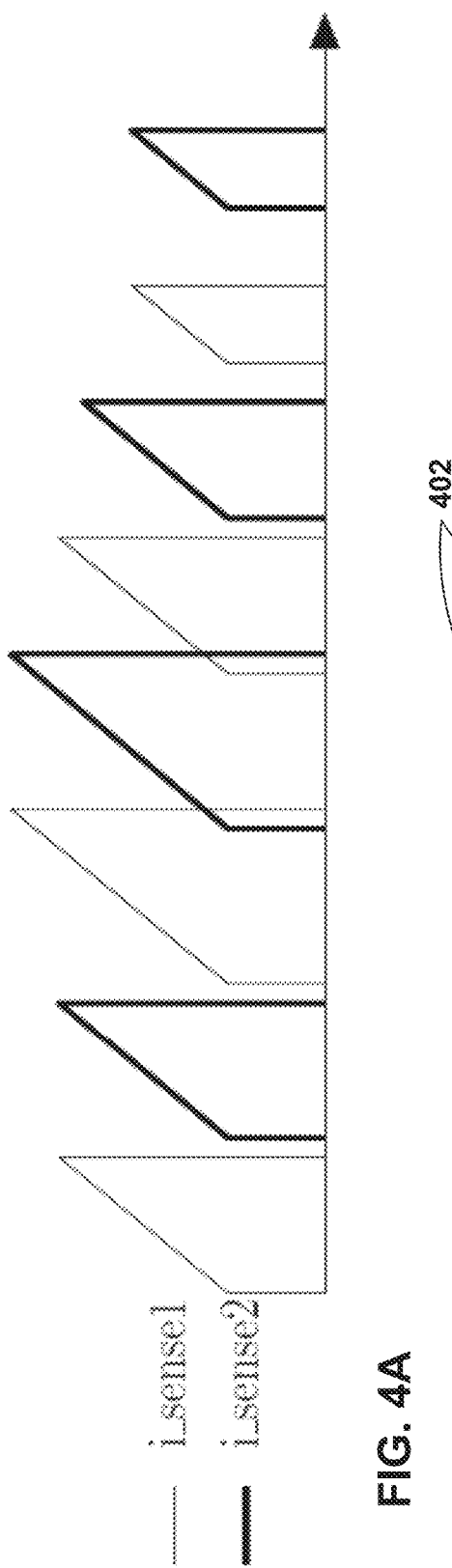
FIG. 4A is a graph illustrating some example sensed currents associated with first and second current loops.
Figure 4B:
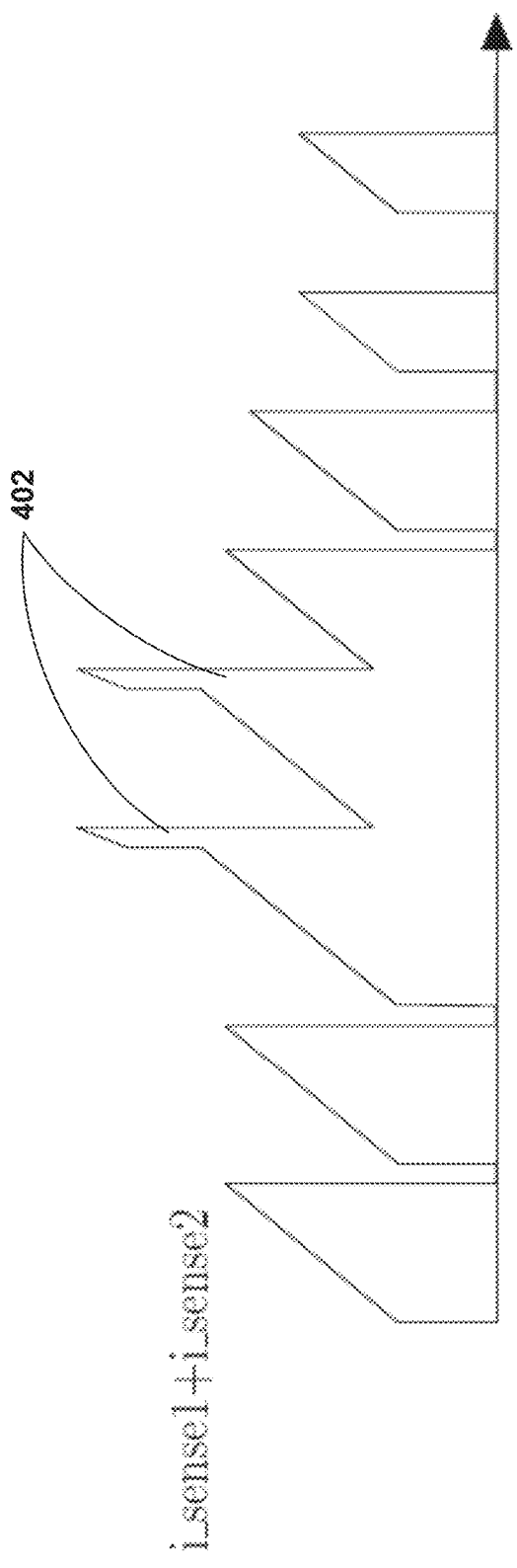
FIG. 4B is a graph illustrating the currents of FIG. 4A being sensed by a common shared current loop.

FIG. 4A is a graph illustrating some example sensed currents associated with first and second current loops. As shown in FIG. 4A, for part of the time, there is current overlap between current from a first phase (isense1) and current from a second phase (isense 2). FIG. 4B is a graph illustrating the currents of FIG. 4A being sensed by a common shared current loop. As can be seen at location 402, sharing of the current detection loop provides an inaccurate measure of current in the second loop because there is overlap of current form the first current loop. Hence, sharing of one or more components of a current detection loop may be disabled (or avoided) in situations like that shown in FIGS. 4A and 4B. In this example, current sensing occurs using components of the master loop for both phases, and the servant loop is disabled. Of course, consistent with FIGS. 2A and 2B, different current sensing units (e.g., 212 or 224) may be used with the shared components of the master loop.

Figure 5:
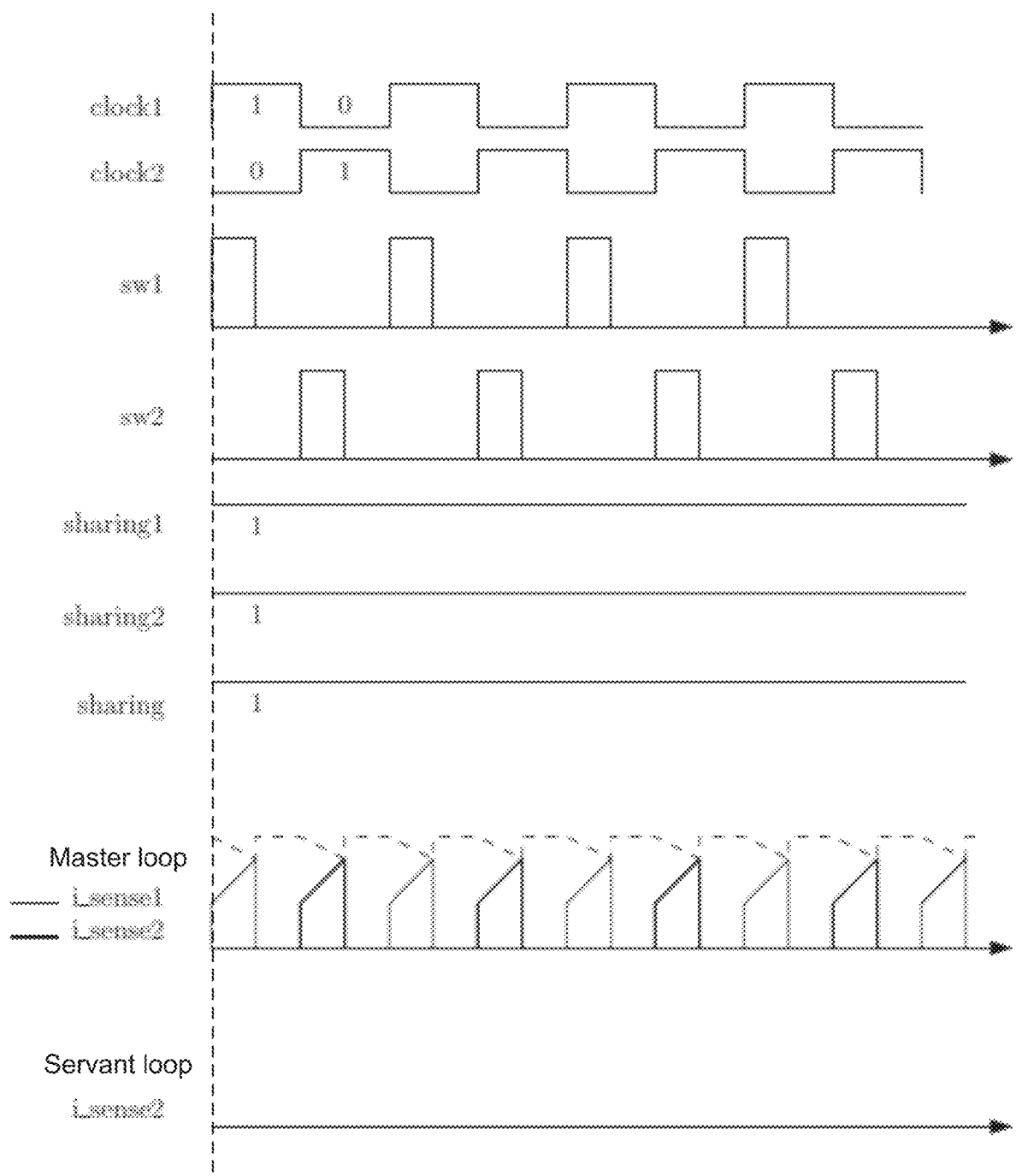
FIG. 5 is a graph illustrating various signals associated with a two-phase power converter operating with both phases having duty cycles less than 50%.

FIG. 5 is a graph illustrating various signals associated with a two-phase power converter operating with both phases having duty cycles less than 50%. In FIG. 5, clock1 and clock2 may provide reference signals that define a 50% duty cycle. As can be seen, sw1 and sw2 are both less than 50% duty cycles, and therefore, sharing1 and sharing2 signals are set to 1. In this case, sharing is enabled, and mismatch can be reduced or eliminated from signals i_sense1 and i_sense2. The sharing signal may comprise a logic AND of sharing1 and sharing2 signals, which may cause sharing to be disabled if either sharing1 signal or sharing2 signal indicate a duty cycle above 50% for either sw1 or sw2. In this case, sharing can be disabled, and current regulation can be ensured In this example, current sensing occurs using components of the master loop for both phases, and the servant loop is disabled. Of course, consistent with FIGS. 2A and 2B, different current sensing units (e.g., 212 or 224) may be used with the shared components of the master loop.

Figure 6:
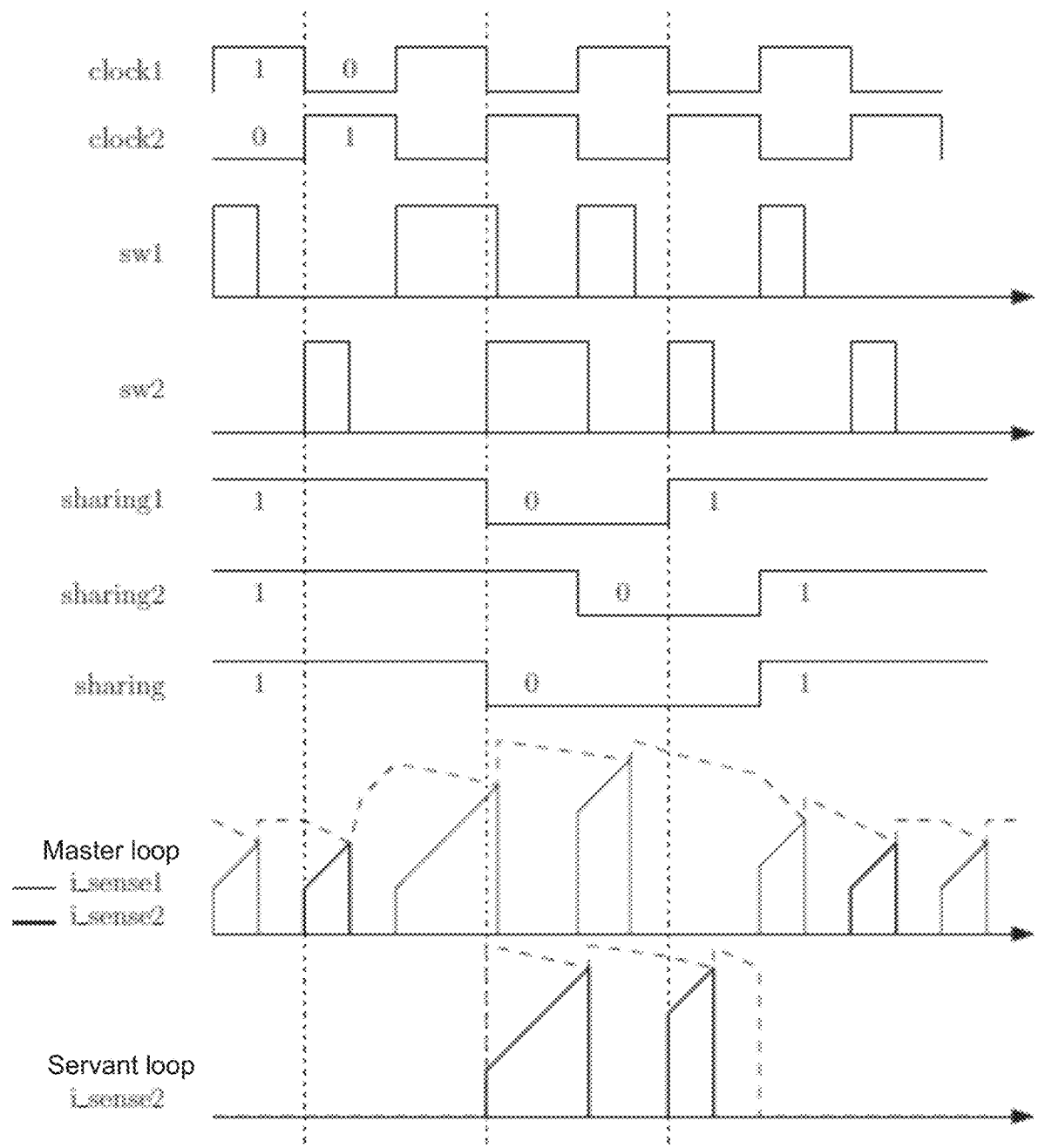
FIG. 6 is another graph illustrating various signals associated with a two-phase power converter operating with some different duty cycles.

FIG. 6 is another graph illustrating various signals associated with a two-phase power converter operating with some different duty cycles. Again, in FIG. 6, clock1 and clock2 may provide reference signals that define a 50% duty cycle. As can be seen, whenever sw1 is less than a 50% duty cycle, sharing 1 is set to 1. Whenever sw2 is less than a 50% duty cycle, sharing 2 is set to 1. However, when sw1 becomes greater than a 50% duty cycle, sharing 1 is set to 0. When sw2 becomes greater than a 50% duty cycle, sharing 2 is set to 0. The sharing signal may comprise a logical AND of sharing1 and sharing2 signals, and therefore sharing is set to 0 anytime sharing1 is zero or sharing2 is zero. In the example of FIG. 6, current sensing occurs using components of the master loop whenever the duty cycle of both phases is less than 50%, in which case the servant loop is disabled. However, current sensing the servant loop is enabled whenever the duty cycle of either of the phases is greater than 50%, in which case both the master loop and the servant loop are enabled. In other words, the servant loop is enabled and shows sensed current whenever the sharing signal is 0. When the sharing signal is 1, the servant loop is disabled so that shared components can eliminate mismatch in the current detection loop of different phases.

Figure 7:
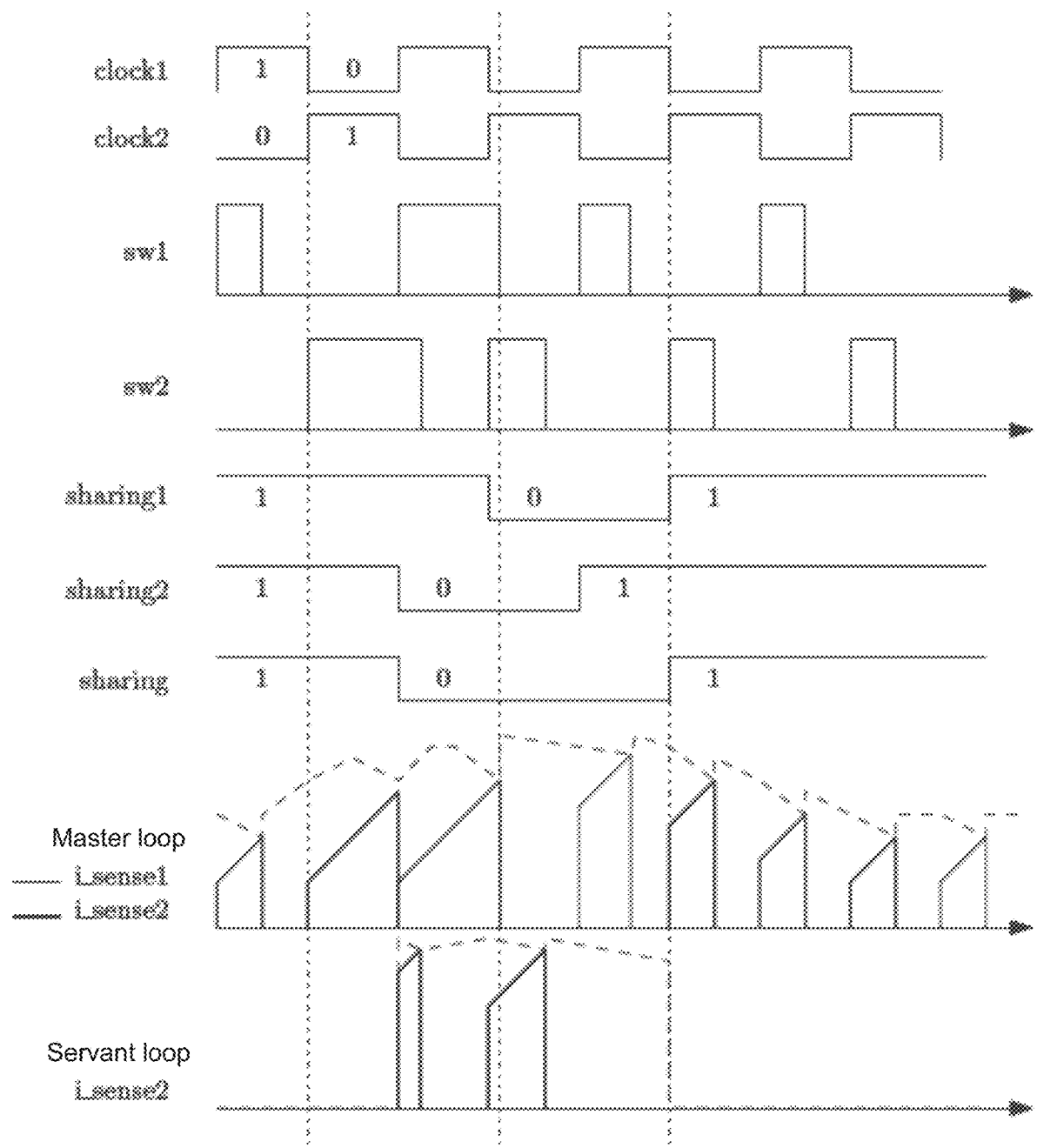
FIG. 7 is another graph illustrating various signals associated with a two-phase power converter operating with some different duty cycles.

FIG. 7 is another graph that is similar to FIG. 6 and illustrates various signals associated with a two-phase power converter operating with some different duty cycles. As with FIG. 6, in FIG. 7, clock1 and clock2 may provide reference signals that define a 50% duty cycle. As can be seen, whenever sw1 is less than a 50% duty cycle, sharing 1 is set to 1. And whenever sw2 is less than a 50% duty cycle, sharing 2 is set to 1. However, when sw1 becomes greater than a 50% duty cycle, sharing 1 is set to 0. When sw2 becomes greater than a 50% duty cycle, sharing 2 is set to 0. The sharing signal may comprise a logical AND of sharing1 and sharing2 signals, and therefore sharing is set to 0 anytime sharing1 is zero or sharing2 is zero. In the example of FIG. 7, current sensing occurs using at least some components of the master loop whenever the duty cycle of both phases is less than 50%, in which case the servant loop is disabled. However, current sensing using all components of the servant loop is enabled whenever the duty cycle of either of the phases is greater than 50%, in which case both the master loop and the servant loop are enabled. In other words, the servant loop is enabled and shows sensed current whenever the sharing signal is 0. When the sharing signal is 1, the servant loop is disabled (except for second current sensor 224), and some or all of the master loop elements are used for current detection (e.g., in combination with second current sensor 224). Shared elements 208, 210 and 212 can eliminate mismatch in the current detection loop of different phases when there is no current overlap between phases.

Figure 8:
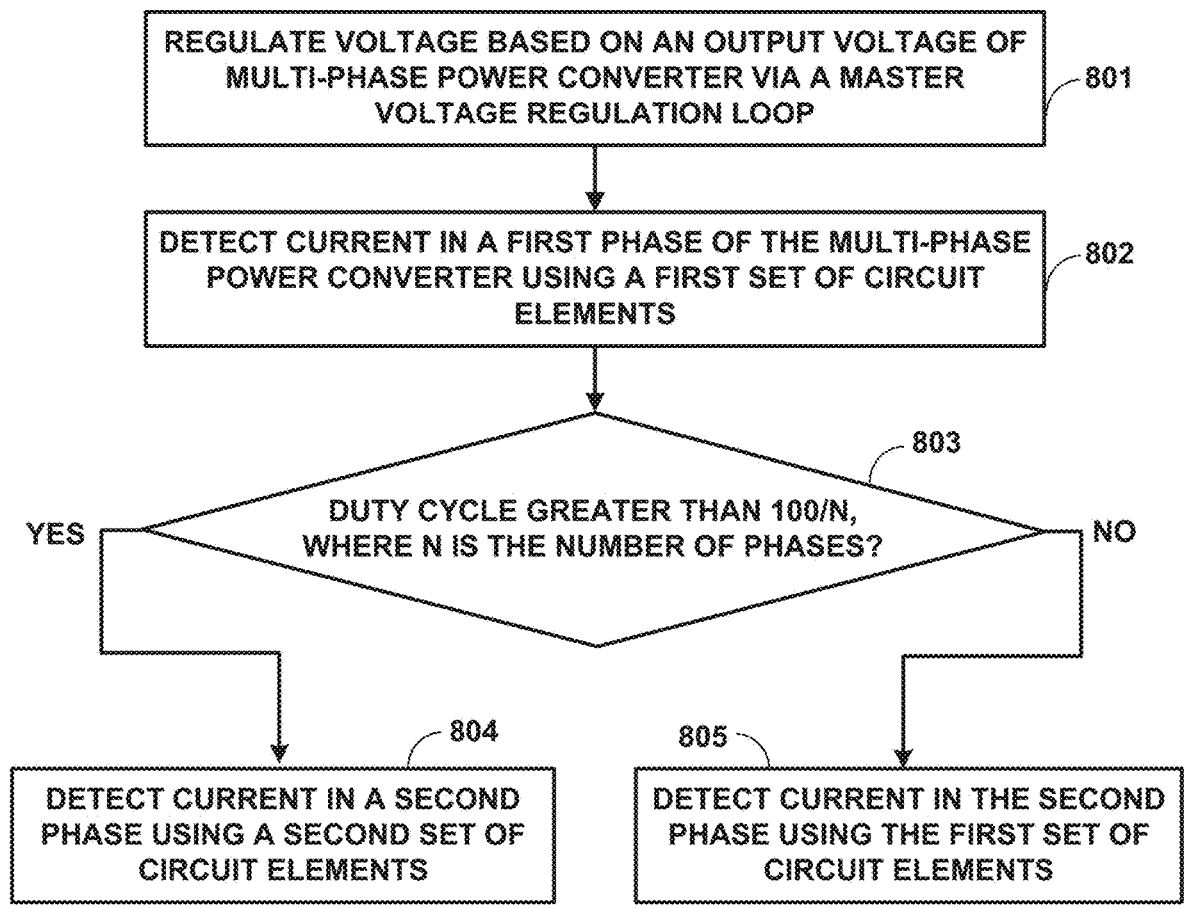
FIG. 8 is a flow diagram illustrating a technique according to an example of this disclosure.

FIG. 8 is a flow diagram illustrating a method according to an example of this disclosure. FIG. 8 will be described from the perspective of circuit 200 of FIGS. 2A and 2B, although other circuits or devices could perform the techniques of FIG. 8. As shown, circuit 200 regulates voltage based on an output voltage of a multi-phase power converter via a master voltage regulation loop (801). For example, error amplifier and compensation circuit 206 receives a feedback voltage (FB) that is indicative of the output of a power converter (e.g., P_out shown in FIG. 1). The output voltage of the power converter may be divided by a resistor network 202 and 204 to generate the feedback voltage (FB) used by error amplifier and compensation circuit 206. In this way, error amplifier and compensation circuit 206 forms a primary voltage regulation loop (e.g., a master regulation loop) for circuit 200 that is based on the output of a power converter.

A first current loop of circuit 200 detects current in a first phase of the multi-phase power converter using a first set of circuit elements (802). For example, to detect current, the first current loop of circuit may comprise current sensor 212 that forms a master current detection loop in combination with a first set of circuit elements 208, 210, 214.

Circuit 200 may be configured to determine whether a duty cycle is greater than 100/N (803), where N is the number of phases of the multi-phase power converter. For example, for a two-phase power converter, circuit 200 may be configured to determine whether the duty cycle is greater than 50 percent. If the duty cycle is greater than 100/N (yes branch of 803), then circuit 200 may be configured to detect current in a second phase using a second set of circuit elements (804), which may comprise a portion of a second current loop. For example, to detect current, second current loop of circuit may comprise current sensor 224 that forms a servant current detection loop in combination with a second set of circuit elements 220, 222, 224. In this case, circuit 200 may be configured as shown in FIG. 2A with switch 250 open and switch 224 closed.

Alternatively, if the duty cycle is less than 100/N (no branch of 803), then circuit 200 may be configured to detect current in the second phase using the first set of circuit elements (805), which may comprise a portion of a master current loop. For example, to detect current, the current sensor 224 that forms part of a servant current detection loop may be used in combination with circuit elements 208, 210, 214 that are part of the master current loop. In this case, circuit 200 may be configured as shown in FIG. 2B with switch 250 closed and switch 252 open. By sharing circuit elements 208, 210, 214 in the current detection loops, when there is no current overlap between phases, mismatch can be eliminated relative to current detection loops that use different elements. In addition, by eliminating or avoiding such sharing when current overlap exists between phases, accurate current detection in the control loop can be ensured for all scenarios.

The following clauses may illustrate one or more aspects of the disclosure.

Clause 1—A circuit configured to detect current in different phases of an N-phase power converter, wherein N is a positive integer greater than 1 that represents a number of phases in the N-phase power converter, the circuit comprising: a first set of elements defining at least part of a first current loop associated with a first phase of the power converter, wherein the first set of elements is configured to detect current during the first phase of the power converter; and a second set of elements defining at least part of a second current loop associated with a second phase of the power converter, wherein the second set of elements is configured to detect current during the second phase of the power converter when a duty cycle associated with the different phases is greater than 100/N, and wherein the first set of elements is configured to detect current during the second phase of the power converter when the duty cycle is less than 100/N.

Clause 2— The circuit of clause 1, further comprising: a third set of elements defining at least part of a third current loop associated with a third phase of the power converter, wherein the third set of elements is configured to detect current during the third phase of the power converter when the duty cycle is greater than 100/N, wherein the first set of elements is configured to detect current during the third phase of the power converter when the duty cycle is less than 100/N.

Clause 3—The circuit of clause 1 or 2, wherein the first set of elements comprise master elements and the second set of elements comprise servant elements.

Clause 4—The circuit of clause 3, wherein the circuit includes one or more switches configured to select between the master elements and the servant elements based on whether the duty cycle is greater than 100/N or less than 100/N.

Clause 5—The circuit of clause 3 or 4, wherein the master elements include a voltage regulation loop and a first current detection loop that is based on a regulated voltage, and wherein the servant elements include a second current detection loop that is based on the regulated voltage.

Clause 6—The circuit of any of clauses 1-5, wherein N=2, and wherein the second set of elements is configured to detect current during the second phase of the power converter when the duty cycle associated with the different phases is greater than 50 percent, wherein the first set of elements is configured to detect current during the second phase of the power converter when the duty cycle is less than 50 percent.

Clause 7—The circuit of any of clauses 1-5, wherein N=3, and wherein the second set of elements is configured to detect current during the second phase of the power converter when the duty cycle associated with the different phases is greater than 33.3 percent, wherein the first set of elements is configured to sense current during the second phase of the power converter when the duty cycle is less than 33.3 percent.

Clause 8—The circuit of any of clauses 1-7, wherein the first set of elements include a first current comparator; and wherein the second set of elements include a second current comparator.

Clause 9—The circuit of any of clauses 1-8, wherein the first set of elements include a first slope compensator; and wherein the second set of elements include a second slope compensator.

Clause 10—The circuit of any of clauses 1-9 wherein the first set of elements include a first pedestal generator; and wherein the second set of elements include a second pedestal generator.

Clause 11—The circuit of any of clauses 1-10, further comprising a first current sensing unit and a second current sensing unit, wherein: the first current sensing unit and the first set of elements are configured to detect current during the first phase of the power converter; the second current sensing unit and the second set of elements are configured to detect current during the second phase of the power converter when the duty cycle is greater than 100/N; and the second current sensing unit and the first set of elements are configured to detect current during the second phase of the power converter when the duty cycle associated is less than 100/N.

Clause 12—A method comprising: detecting current in a first phase of a multiphase power converter using a first set of circuit elements; detecting current in a second phase of the multiphase power converter using a second set of circuit elements when a duty cycle duty cycle associated with different phases of the multiphase power converter is greater than 100/N, wherein N is a positive integer greater than 1 that represents a number of phases in the multiphase power converter; and detecting current in the second phase of the multiphase power converter using the first set of circuit elements when the duty cycle duty cycle is less than 100/N.

Clause 13—The method of clause 12, further comprising: detecting the duty cycle; and controlling one or more switches based on the duty cycle, wherein controlling the one or more switches selects either the first set of circuit elements or the second set of circuit elements for detecting current in the second phase.

Clause 14—The method of clause 12 or 13, further comprising: detecting current in a third phase of the multiphase power converter using a third set of circuit elements when the duty cycle duty cycle is greater than 100/N; and detecting current in the third phase of the multiphase power converter using the first set of circuit elements when the duty cycle duty cycle is less than 100/N.

Clause 15—The method of any of clauses 12-14, wherein the first set of elements comprise master elements and the second set of elements comprise servant elements.

Clause 16—The method of clause 15, wherein the master elements include a voltage regulation loop and a first current detection loop that is based on a regulated voltage, and wherein the servant elements include a second current detection loop that is based on the regulated voltage.

Clause 17—The method of any of clauses 12-15, wherein: the first set of elements include a first current comparator; the second set of elements include a second current comparator; the first set of elements include a first slope compensator; the second set of elements include a second slope compensator; the first set of elements include a first pedestal generator; the second set of elements include a second pedestal generator; and the multiphase power converter includes a first current sensing unit and a second current sensing unit, the method further comprising: detecting the current during the first phase using the first current sensing unit and the first set of elements; detecting the current during the second phase using the second current sensing unit and the second set of elements when the duty cycle is greater than 100/N; and detecting the current during the second phase using the second current sensing unit and the first set of elements when the duty cycle associated is less than 100/N.

Clause 18—A multiphase power converter comprising: a plurality of inductors associated with N phases of the multiphase power converter, wherein N is a positive integer greater than 1 that represents a number of phases in the multiphase power converter; one or more output capacitors that are configured to be charged by the plurality of inductors during the N phases; and a circuit configured to detect current in different phases of the multiphase power converter, the circuit comprising: a first set of elements defining at least part of a first current loop associated with a first phase of the multiphase power converter, wherein the first set of elements is configured to detect current during the first phase of the multiphase power converter; and a second set of elements defining at least part of a second current loop associated with a second phase of the multiphase power converter, wherein the second set of elements is configured to detect current during the second phase of the multiphase power converter when a duty cycle associated with the different phases is greater than 100/N, and wherein the first set of elements is configured to detect current during the second phase of the multiphase power converter when the duty cycle is less than 100/N.

Clause 19—The multiphase power converter of clause 18, wherein: the first set of elements include a first current comparator; the second set of elements include a second current comparator; the first set of elements include a first slope compensator; the second set of elements include a second slope compensator; the first set of elements include a first pedestal generator; and the second set of elements include a second pedestal generator.

Clause 20—The multiphase power converter of clause 18 or 19, the circuit further comprising a first current sensing unit and a second current sensing unit, wherein: the first current sensing unit and the first set of elements are configured to detect current during the first phase of the power converter; the second current sensing unit and the second set of elements are configured to detect current during the second phase of the power converter when the duty cycle is greater than 100/N; and the second current sensing unit and the first set of elements are configured to detect current during the second phase of the power converter when the duty cycle associated is less than 100/N.

Various aspects have been described in this disclosure. These and other aspects are within the scope of the following claims.

The invention claimed is:

1. A circuit configured to detect current in different phases of an N-phase power converter, wherein N is a positive integer greater than 1 that represents a number of phases in the N-phase power converter, the circuit comprising:
a first set of elements defining at least part of a first current loop associated with a first phase of the power converter, wherein the first set of elements is configured to detect current during the first phase of the power converter; and
a second set of elements defining at least part of a second current loop associated with a second phase of the power converter, wherein the second set of elements is configured to detect current during the second phase of the power converter when a duty cycle associated with the different phases is greater than 100/N, wherein the first set of elements is configured to detect current during the second phase of the power converter when the duty cycle is less than 100/N, wherein the first set of elements includes a first current comparator and a first slope compensator, and wherein the second set of elements includes a second current comparator and a second slope compensator.

2. The circuit of claim 1, further comprising:
a third set of elements defining at least part of a third current loop associated with a third phase of the power converter, wherein the third set of elements is configured to detect current during the third phase of the power converter when the duty cycle is greater than 100/N, wherein the first set of elements is configured to detect current during the third phase of the power converter when the duty cycle is less than 100/N.

3. The circuit of claim 1, wherein the first set of elements comprise master elements and the second set of elements comprise servant elements.

4. The circuit of claim 3, wherein the circuit includes one or more switches configured to select between the master elements and the servant elements based on whether the duty cycle is greater than 100/N or less than 100/N.

5. The circuit of claim 3, wherein the master elements include a voltage regulation loop and a first current detection loop that is based on a regulated voltage, and wherein the servant elements include a second current detection loop that is based on the regulated voltage.

6. The circuit of claim 1, wherein N=2, and wherein the second set of elements is configured to detect current during the second phase of the power converter when the duty cycle associated with the different phases is greater than 50 percent, wherein the first set of elements is configured to detect current during the second phase of the power converter when the duty cycle is less than 50 percent.

7. The circuit of claim 1, wherein N=3, and wherein the second set of elements is configured to detect current during the second phase of the power converter when the duty cycle associated with the different phases is greater than 33.3 percent, wherein the first set of elements is configured to sense current during the second phase of the power converter when the duty cycle is less than 33.3 percent.

8. The circuit of claim 1,
wherein the first set of elements include a first pedestal generator; and
wherein the second set of elements include a second pedestal generator.

9. The circuit of claim 1, further comprising a first current sensing unit and a second current sensing unit, wherein:
the first current sensing unit and the first set of elements are configured to detect current during the first phase of the power converter;
the second current sensing unit and the second set of elements are configured to detect current during the second phase of the power converter when the duty cycle is greater than 100/N; and
the second current sensing unit and the first set of elements are configured to detect current during the second phase of the power converter when the duty cycle associated is less than 100/N.

10. A method comprising:
detecting current in a first phase of a multiphase power converter using a first set of circuit elements;
detecting current in a second phase of the multiphase power converter using a second set of circuit elements when a duty cycle associated with different phases of the multiphase power converter is greater than 100/N, wherein N is a positive integer greater than 1 that represents a number of phases in the multiphase power converter; and
detecting current in the second phase of the multiphase power converter using the first set of circuit elements when the duty cycle is less than 100/N, wherein the method further comprises:
detecting the duty cycle; and
controlling one or more switches based on the duty cycle, wherein controlling the one or more switches selects either the first set of circuit elements or the second set of circuit elements for detecting current in the second phase.

11. The method of claim 10, further comprising:
detecting current in a third phase of the multiphase power converter using a third set of circuit elements when the duty cycle is greater than 100/N; and
detecting current in the third phase of the multiphase power converter using the first set of circuit elements when the duty cycle is less than 100/N.

12. The method of claim 10, wherein the first set of elements comprise master elements and the second set of elements comprise servant elements.

13. The method of claim 12, wherein the master elements include a voltage regulation loop and a first current detection loop that is based on a regulated voltage, and wherein the servant elements include a second current detection loop that is based on the regulated voltage.

14. The method of claim 10, wherein:
the first set of elements include a first current comparator;
the second set of elements include a second current comparator;
the first set of elements include a first slope compensator;
the second set of elements include a second slope compensator;
the first set of elements include a first pedestal generator;
the second set of elements include a second pedestal generator; and
the multiphase power converter includes a first current sensing unit and a second current sensing unit, the method further comprising:
detecting the current during the first phase using the first current sensing unit and the first set of elements;
detecting the current during the second phase using the second current sensing unit and the second set of elements when the duty cycle is greater than 100/N; and
detecting the current during the second phase using the second current sensing unit and the first set of elements when the duty cycle associated is less than 100/N.

15. A multiphase power converter comprising:
a plurality of inductors associated with N phases of the multiphase power converter, wherein N is a positive integer greater than 1 that represents a number of phases in the multiphase power converter;
one or more output capacitors that are configured to be charged by the plurality of inductors during the N phases; and
a circuit configured to detect current in different phases of the multiphase power converter, the circuit comprising:
a first set of elements defining at least part of a first current loop associated with a first phase of the multiphase power converter, wherein the first set of elements is configured to detect current during the first phase of the multiphase power converter; and
a second set of elements defining at least part of a second current loop associated with a second phase of the multiphase power converter, wherein the second set of elements is configured to detect current during the second phase of the multiphase power converter when a duty cycle associated with the different phases is greater than 100/N, and wherein the first set of elements is configured to detect current during the second phase of the multiphase power converter when the duty cycle is less than 100/N, wherein the circuit is further configured to:
detect the duty cycle; and
control one or more switches based on the duty cycle, wherein controlling the one or more switches selects either the first set of circuit elements or the second set of circuit elements for detecting current in the second phase.

16. The multiphase power converter of claim 15, wherein:
the first set of elements include a first current comparator;
the second set of elements include a second current comparator;
the first set of elements include a first slope compensator;
the second set of elements include a second slope compensator;
the first set of elements include a first pedestal generator; and
the second set of elements include a second pedestal generator.

17. The multiphase power converter of claim 16, the circuit further comprising a first current sensing unit and a second current sensing unit, wherein:
the first current sensing unit and the first set of elements are configured to detect current during the first phase of the power converter;
the second current sensing unit and the second set of elements are configured to detect current during the second phase of the power converter when the duty cycle is greater than 100/N; and
the second current sensing unit and the first set of elements are configured to detect current during the second phase of the power converter when the duty cycle associated is less than 100/N.

18. A circuit configured to:
detect current in a first phase of a multiphase power converter using a first set of circuit elements;
detect current in a second phase of the multiphase power converter using a second set of circuit elements when a duty cycle associated with different phases of the multiphase power converter is greater than 100/N, wherein N is a positive integer greater than 1 that represents a number of phases in the multiphase power converter; and
detect current in the second phase of the multiphase power converter using the first set of circuit elements when the duty cycle is less than 100/N, wherein the circuit is further configured to:
detect the duty cycle; and
control one or more switches based on the duty cycle, wherein controlling the one or more switches selects either the first set of circuit elements or the second set of circuit elements for detecting current in the second phase.

19. The circuit of claim 18, wherein the first set of elements include a first current comparator and a first slope compensator, and wherein the second set of elements include a second current comparator and a second slope compensator.

20. The circuit of claim 19,
wherein the first set of elements include a first pedestal generator; and
wherein the second set of elements include a second pedestal generator.

* * * * *